(12) United States Patent
Wu

(10) Patent No.: US 12,524,341 B2
(45) Date of Patent: Jan. 13, 2026

(54) RECEIVING EXECUTABLE INSTRUCTIONS FROM VOLATILE MEMORY

(71) Applicant: Micron Technology, Inc., Boise, ID (US)

(72) Inventor: Minjian Wu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 39 days.

(21) Appl. No.: 18/573,913

(22) PCT Filed: Aug. 29, 2022

(86) PCT No.: PCT/CN2022/115428
§ 371 (c)(1),
(2) Date: Dec. 22, 2023

(87) PCT Pub. No.: WO2024/044876
PCT Pub. Date: Mar. 7, 2024

(65) Prior Publication Data
US 2025/0103491 A1    Mar. 27, 2025

(51) Int. Cl.
*G06F 12/06* (2006.01)
*G06F 9/4401* (2018.01)

(52) U.S. Cl.
CPC ........ *G06F 12/0638* (2013.01); *G06F 9/4401* (2013.01); *G06F 2212/214* (2013.01)

(58) Field of Classification Search
None
See application file for complete search history.

(56) References Cited

U.S. PATENT DOCUMENTS

| | | | |
|---|---|---|---|
| 7,024,549 B1* | 4/2006 | Luu | G06F 9/441 713/1 |
| 10,114,653 B2 | 10/2018 | Bower et al. | |
| 2006/0053246 A1 | 3/2006 | Lee | |
| 2012/0079171 A1 | 3/2012 | Ju et al. | |
| 2012/0126943 A1* | 5/2012 | Biondo | G07C 9/00182 340/5.64 |
| 2017/0315215 A1* | 11/2017 | Berezin | G01S 7/412 |
| 2018/0239609 A1* | 8/2018 | Jang | G06F 9/4406 |
| 2022/0284105 A1* | 9/2022 | Krishnegowda | G06F 13/1668 |

FOREIGN PATENT DOCUMENTS

| | | |
|---|---|---|
| CN | 101421701 | 4/2009 |
| CN | 114816811 | 7/2022 |

OTHER PUBLICATIONS

Dong, U.S. Appl. No. 17/889,810, filed Aug. 17, 2022.

* cited by examiner

*Primary Examiner* — Charles J Choi
(74) *Attorney, Agent, or Firm* — Brooks, Cameron & Huebsch, PLLC

(57) ABSTRACT

The present disclosure includes apparatuses, methods, and systems for receiving executable instructions from volatile memory. In an example, a method can include storing executable instructions comprising a bootloader at a pre-defined memory address range in a non-volatile memory device of a solid state drive (SSD), copying the executable instructions from the pre-defined memory address range to a volatile memory device of the SSD in response to powering on the SSD, and transmitting the executable instructions from the volatile memory device to a host.

20 Claims, 4 Drawing Sheets

RECEIVING EXECUTABLE INSTRUCTIONS FROM VOLATILE MEMORY

PRIORITY INFORMATION

This application is a National Stage Application under 35 U.S.C § of International Application Number PCT/CN2022/115428, filed on Aug. 29, 2022, the contents of which are incorporated herein by reference.

TECHNICAL FIELD

The present disclosure relates generally to apparatuses, methods, and systems for receiving executable instructions from volatile memory.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), static random access memory (SRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), and magnetic random access memory (MRAM), among others.

Memory devices can be combined together to form a solid state drive (SSD), an embedded MultiMediaCard (e.MMC), and/or a universal flash storage (UFS) device. An SSD, e.MMC, and/or UFS device can include non-volatile memory (e.g., NAND flash memory and/or NOR flash memory), and/or can include volatile memory (e.g., DRAM and/or SDRAM), among various other types of non-volatile and volatile memory.

A host can utilize memory devices to store data. A host can be a vehicle, for example. Vehicles are becoming more dependent upon memory devices to provide storage for components that were previously mechanical, independent, or non-existent. A vehicle can include a computing system, which can be a host for a memory device. The vehicle may be driver operated, driver-less (autonomous), and/or partially autonomous.

DETAILED DESCRIPTION

Figure 1:
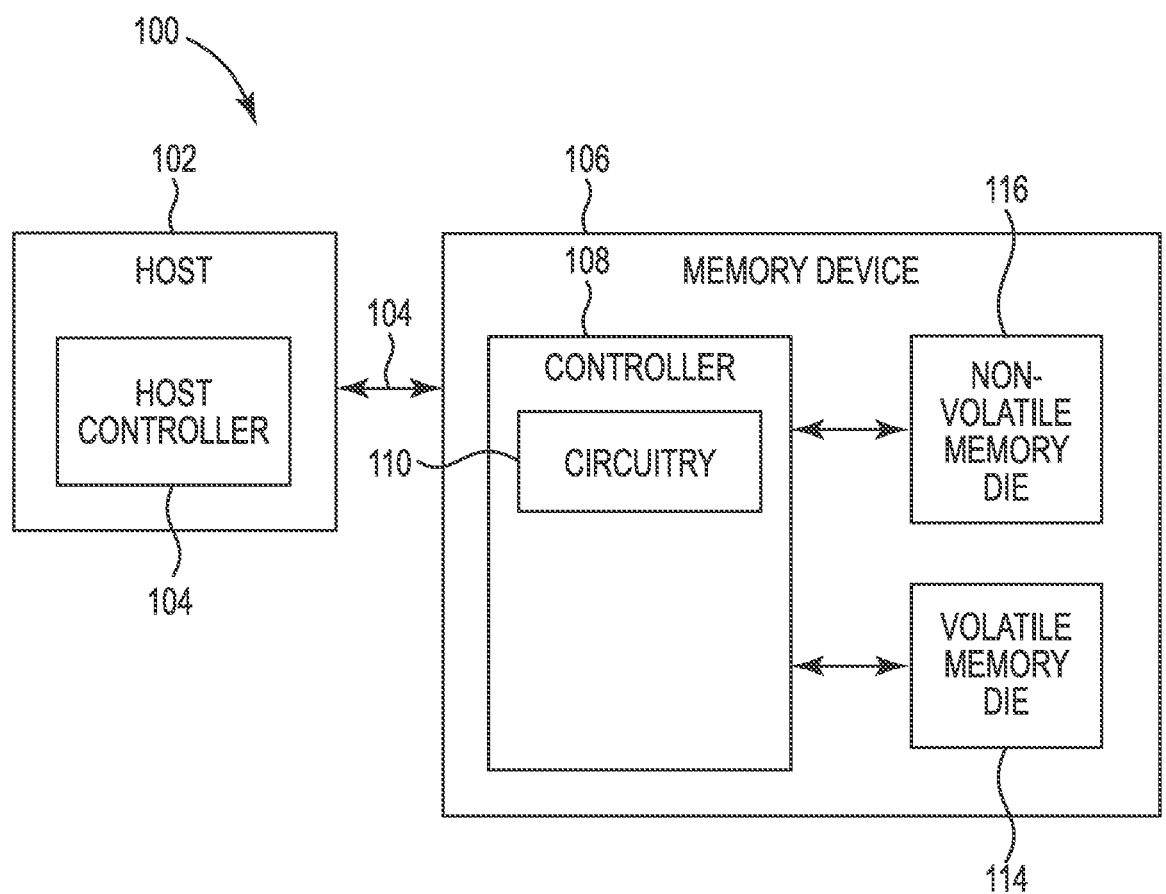
FIG. 1 is a block diagram of a computing system including a host and an apparatus in the form of a memory device in accordance with an embodiment of the present disclosure.

The present disclosure includes apparatuses, methods, and systems for receiving executable instructions from volatile memory. In an example, a method can include storing executable instructions comprising a bootloader at a pre-defined memory address range in a non-volatile memory device of a solid state drive (SSD), copying the executable instructions from the pre-defined memory address range to a volatile memory device of the SSD in response to powering on the SSD, and transmitting the executable instructions from the volatile memory device to a host.

The process of booting can include starting the computing system and loading data including software to be executed. Ordinarily, data is loaded from non-volatile memory to a primary memory resource of a host (e.g., a processor), such as RAM, cache, registers, etc. Non-volatile memory can be slower than volatile memory. Accordingly, there can be latency associated with loading bootloaders from non-volatile memory, which can increase the time it takes a computing system to boot. A computing system can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

Aspects of the present disclosure address the above and other deficiencies by loading executable instructions from non-volatile memory into volatile memory at startup of a memory device. For example, data including bootloaders and/or an operating system within an address range can be loaded from NAND to DRAM of an SSD once a voltage is supplied to the SSD.

As used herein, "a", "an", or "a number of" can refer to one or more of something, and "a plurality of" can refer to two or more such things. For example, a number of bootloaders can refer to one or more bootloaders, and a plurality of bootloaders can refer to two or more bootloaders. Additionally, designators such as "N", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

FIG. 1 is a block diagram of a computing system 100 including a host 102 and an apparatus in the form of a memory device 106 in accordance with an embodiment of the present disclosure. As used herein, an "apparatus" can refer to, but is not limited to, any of a variety of structures or combinations of structures, such as a circuit or circuitry, a die or dice, a module or modules, a device or devices, or a system or systems, for example. Further, in an embodiment, computing system 100 can include a number of memory devices analogous to memory device 106.

The computing system 100 including host 102 and/or memory device 106 can be, or be part of, an Internet of Things (IoT) enabled device, a vehicle, an automation tool, an industrial protocol camera among other host systems, and can include a memory access device (e.g., a processor). One of ordinary skill in the art will appreciate that "a processor" can intend one or more processors, such as a parallel processing system, a number of coprocessors, etc.

In the embodiment illustrated in FIG. 1, memory device 106 can include a non-volatile memory die 116 and a volatile memory die 114. The memory device 106 can be an SSD. The non-volatile memory die 116 can be a flash memory die such as a NAND flash die and the volatile memory die 114 can be a DRAM, for example. Embodiments are not limited to any particular quantity of non-volatile memory dies 116 or volatile memory dies 114 in the memory device 106. One of each is illustrated as an example.

A number of physical blocks of memory cells can be included in a plane of memory cells, and a number of planes of memory cells can be included on non-volatile memory die 116 and/or volatile memory die 114. The memory cells can be single level cells and/or multilevel cells such as, for instance, two level cells, triple level cells (TLCs) or quadruple level cells (QLCs). Each physical block can include a number of physical rows of memory cells coupled to access lines (e.g., word lines). The number of rows (e.g., word lines) in each physical block can be 32, but embodiments are not limited to a particular number of rows per physical block. Further, although not shown in FIG. 1, the memory cells can be coupled to columns of sense lines (e.g., data lines and/or digit lines).

As one of ordinary skill in the art will appreciate, each row can include a number of pages of memory cells (e.g., physical pages). A physical page refers to a unit of programming and/or sensing (e.g., a number of memory cells that are programmed and/or sensed together as a functional group). In a number of embodiments, each row can comprise one physical page of memory cells. However, embodiments of the present disclosure are not so limited. For instance, in an embodiment, each row can comprise multiple physical pages of memory cells (e.g., one or more even pages of memory cells coupled to even-numbered data lines, and one or more odd pages of memory cells coupled to odd numbered data lines). Additionally, for embodiments including multilevel cells, a physical page of memory cells can store multiple pages (e.g., logical pages) of data (e.g., an upper page of data and a lower page of data, with each cell in a physical page storing one or more bits towards an upper page of data and one or more bits towards a lower page of data).

In some examples, a page of memory cells can comprise a number of physical sectors (e.g., subsets of memory cells). Each physical sector of cells can store a number of logical sectors of data. Additionally, each logical sector of data can correspond to a portion of a particular page of data. As an example, a first logical sector of data stored in a particular physical sector can correspond to a logical sector corresponding to a first page of data, and a second logical sector of data stored in the particular physical sector can correspond to a second page of data. Each physical sector can store system and/or user data, and/or can include overhead data, such as error correction code (ECC) data, logical block address (LBA) data, and metadata.

Logical block addressing is a scheme that can be used by a host for identifying a logical sector of data. For example, each logical sector can correspond to a unique logical block address (LBA). Additionally, an LBA may also correspond (e.g., dynamically map) to a physical address, such as a physical block address (PBA), that may indicate the physical location of that logical sector of data in the memory. A logical sector of data can be a number of bytes of data (e.g., 256 bytes, 512 bytes, 1,024 bytes, or 4,096 bytes). However, embodiments are not limited to these examples.

It is noted that other configurations for the physical blocks, rows, sectors, and pages are possible. For example, rows of physical blocks can each store data corresponding to a single logical sector which can include, for example, more or less than 512 bytes of data.

As illustrated in FIG. 1, host 102 can be coupled to the memory device 106 via host interface 103. Host 102 and memory device 106 can communicate (e.g., send commands and/or data) on host interface 103. Host interface 103 can be in the form of a standardized physical interface. For example, when memory device 106 is used for information storage in computing system 100, host interface 103 can be a serial advanced technology attachment (SATA) physical interface, a peripheral component interconnect express (PCIe) physical interface, a universal serial bus (USB) physical interface, or a small computer system interface (SCSI), among other physical connectors and/or interfaces. In general, however, host interface 103 can provide an interface for passing control, address, information (e.g., data), and other signals between memory device 106 and host 102 having compatible receptors for host interface 103.

Memory device 106 includes controller 108 to communicate with host 102, non-volatile memory die 116, and volatile memory die 114. For instance, controller 108 can send commands to perform operations on non-volatile memory die 116 and/or volatile memory die 114, including operations to sense (e.g., read), program (e.g., write), move, and/or erase data, among other operations.

Controller 108 can be included on the same physical device (e.g., the same die) as non-volatile memory die 116. Alternatively, controller 108 can be included on a separate physical device that is communicatively coupled to the physical device that includes non-volatile memory die 116. In an embodiment, components of controller 108 can be spread across multiple physical devices (e.g., some components on the same die as the memory, and some components on a different die, module, or board) as a distributed controller.

The host 102 can include a host controller 104 to communicate with memory device 106. The host controller 104 can be coupled to and/or send commands to memory device 106 and/or controller 108 via host interface 103. The host controller 104 can communicate with memory device 106 and/or the controller 108 on the memory device 106 to read, write, and/or erase data, among other operations. For example, the host 102 can transmit a power on command to the memory device 106 to boot the memory device 106 via the host interface 103.

Executable instructions can be stored in the non-volatile memory die 116, which prevents the executable instructions from being deleted when the memory device 106 is powered down. When the memory device 106 is powered on, ordinarily, the executable instructions would be loaded from the non-volatile memory die 116 to the host 102. However, non-volatile memory can be slower than volatile memory. Accordingly, there can be latency associated with loading bootloaders from non-volatile memory, which can increase the time it takes a computing system to boot.

In a number of embodiments, the host 102 can receive executable instructions from the volatile memory die 114 of the memory device 106 instead of receiving the executable instructions from the non-volatile memory die 116 to reduce latency. For example, controller 108 can transmit executable instructions from first, second, and third address memory ranges of the volatile memory die 114 to the host 102 sequentially via the host interface 103. The executable instructions can include a number of bootloaders, an operating system, utilities, diagnostics, or boot and data recovery information, for example.

In some examples, the computing system 100 can be a vehicle and the memory device 106 of the vehicle can be powered on in response to a proximity of a fob of the vehicle being detected and/or the vehicle being turned on. In response to the proximity of the fob of the vehicle being detected and/or the vehicle being powered on, the memory device 106 can transfer a first bootloader from the non-volatile memory die 116 to the volatile memory die 114. Then the first bootloader can be transmitted from the volatile memory die 114 to the host 102. In a number of embodiments, execution of the first bootloader can include reading a second bootloader image, which allows the host 102 to load the image of the second bootloader from the non-volatile memory die 116 to the volatile memory die 114 to the host 102. Execution of the second bootloader can include reading a third bootloader image, which allows the host 102 to load the image of the third bootloader from the non-volatile memory die 116 to the volatile memory die 114 to the host 102. Execution of the third bootloader can include reading an operating system image, which allows the host 102 to load the image of the operating system from the non-volatile memory die 116 to the volatile memory die 114 to the host 102.

Controller 108 on memory device 106 and/or host controller 104 on host 102 can include control circuitry and/or logic (e.g., hardware and firmware). In an embodiment, controller 108 on memory device 106 and/or host controller 104 on host 102 can be an application specific integrated circuit (ASIC) coupled to a printed circuit board including a physical interface. Also, memory device 106 and/or host 102 can include a buffer of volatile and/or non-volatile memory and one or more registers.

As shown in FIG. 1, memory device 106 can include circuitry 110. In the embodiment illustrated in FIG. 1, circuitry 110 is included in controller 108. However, embodiments of the present disclosure are not so limited. For instance, in an embodiment, circuitry 110 may be included in non-volatile memory die 116 (e.g., instead of in controller 108). Circuitry 110 can comprise, for instance, hardware, firmware, and/or software for performing operations described herein. For example, the circuitry 110 can be configured to store executable instructions at a pre-defined memory address range in the non-volatile memory die 116, copy the executable instructions from the pre-defined memory address range to the volatile memory die 114, and transmit the executable instructions from the volatile memory die 114 to the host 102.

Figure 2:
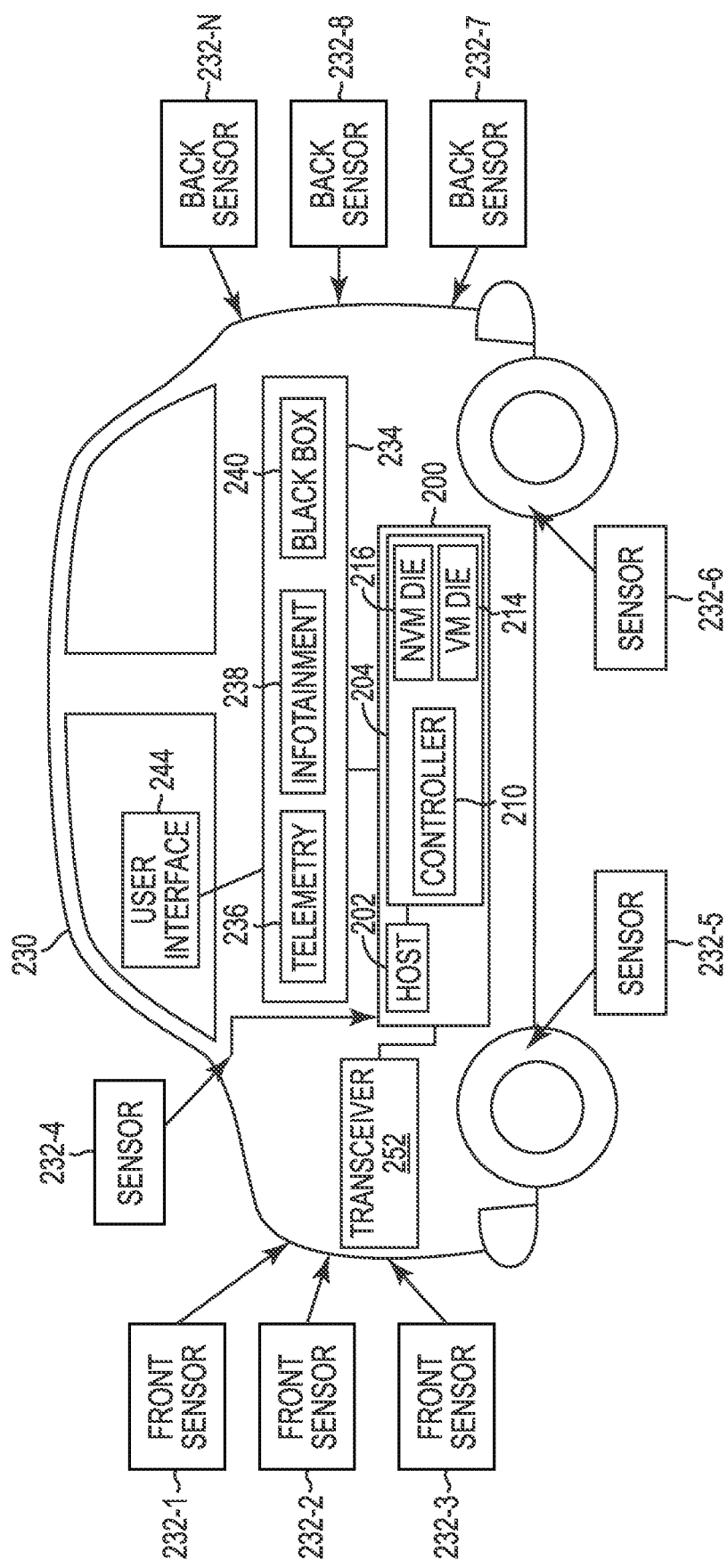
FIG. 2 illustrates an example of a system including a computing system in a vehicle in accordance with some embodiments of the present disclosure.

FIG. 2 illustrates an example of a system including a computing system 200 in a vehicle 230 in accordance with some embodiments of the present disclosure. The computing system 200 can include a memory device 206, which is illustrated as including a controller 210, non-volatile memory die 216, and volatile memory die 214 for simplicity. The memory device 206 is coupled to a host 202.

The computing system 200, and thus the host 202, can be coupled to a number of sensors 232 either directly, as illustrated for the sensor 232-4 or via a transceiver 252 as illustrated for the sensors 232-1, 232-2, 232-3, 232-5, 232-6, 232-7, 232-8, . . . , 232-N. The transceiver 252 is able to receive data from the sensors 232 wirelessly, such as by radio frequency communication. In at least one embodiment, each of the sensors 232 can communicate with the computing system 200 wirelessly via the transceiver 252. In at least one embodiment, each of the sensors 232 is connected directly to the computing system 200 (e.g., via wires or optical cables).

The vehicle 230 can be a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, a ship, and/or anything used for transporting people and/or goods. The sensors 232 are illustrated in FIG. 2 as including example attributes. For example, sensors 232-1, 232-2, and 232-3 are cameras collecting data from the front of the vehicle 230. Sensors 232-4, 232-5, and 232-6 are microphone sensors collecting data from the from the front, middle, and back of the vehicle 230. The sensors 232-7, 232-8, and 232-N are cameras collecting data from the back of the vehicle 230. As another example, the sensors 232-5, 232-6 are tire pressure sensors. As another example, the sensor 232-4 is a navigation sensor, such as a global positioning system (GPS) receiver. As another example, the sensor 232-6 is a speedometer. As another example, the sensor 232-4 represents a number of engine sensors such as a temperature sensor, a pressure sensor, a voltmeter, an ammeter, a tachometer, a fuel gauge, etc. As another example, the sensor 232-4 represents a camera. Video data can be received from any of the sensors 232 associated with the vehicle 230 comprising cameras. In at least one embodiment, the video data can be compressed by the host 202 before providing the video data to the memory device 206.

The host 202 can execute instructions to provide an overall control system and/or operating system for the vehicle 230. When a user starts the vehicle 230, the user does not want to have to wait for the operating system to load, the user wants to be able to drive right away. Therefore, on startup, the non-volatile memory die 216 starts transferring bootloaders and the operating system to faster memory, for example, the volatile memory die 214 to decrease the time between the user starting the vehicle and the user being able to drive.

The host 202 can be a controller designed to assist in automation endeavors of the vehicle 230. For example, the host 202 can be ADAS controllers. An ADAS can monitor data to prevent accidents and provide warning of potentially unsafe situations. For example, the ADAS can monitor sensors in the vehicle 230 and take control of vehicle 230 operations to avoid accident or injury (e.g., to avoid accidents in the case of an incapacitated user of a vehicle). The host 202 may need to act and make decisions quickly to avoid accidents. The memory device 206 can store reference data such that data from the sensors 232 can be compared to the reference data by the host 202 in order to make quick decisions.

The host 202 can write data received from one or more sensors 232 and store the data (e.g., in association with a black box application 240 for the vehicle). The black box application 240 may also be referred to as an accident data recorder. With the advent of autonomous vehicles, some autonomous driving requires real time buffering of telemetric data such as video cameras, RADAR, LIDAR, ultrasonic, and other sensors necessary to playback the sequences preceding an accident. Upon an event, a quantity (e.g., thirty seconds) of playback time immediately preceding an event needs to be captured to determine the cause of an incident. A playback may be referred to as a "snapshot". The application that controls storage of such information is referred to herein as a black box. A black box may need to store at least a few, most recent snapshots.

The host 202 can execute instructions to provide a set of applications 234 for the vehicle 230 including telemetry 236, infotainment 238, and a black box 240. The telemetry application 236 can provide information displayable on a user interface 244 such as may be associated with the instrumentation and/or dashboard of a vehicle 230. An example of such telemetric information is the speed at which the vehicle 230 is traveling (e.g., based at least in part on data from a sensor 232). The infotainment application 238 can include information and/or entertainment for a user of the vehicle 230 displayable or interfaced via the user interface 244. Examples of such information and/or entertainment include music, movies, GPS information such as a moving map, etc. The memory device 206 can provide storage for any of the set of applications 234.

Figure 3:
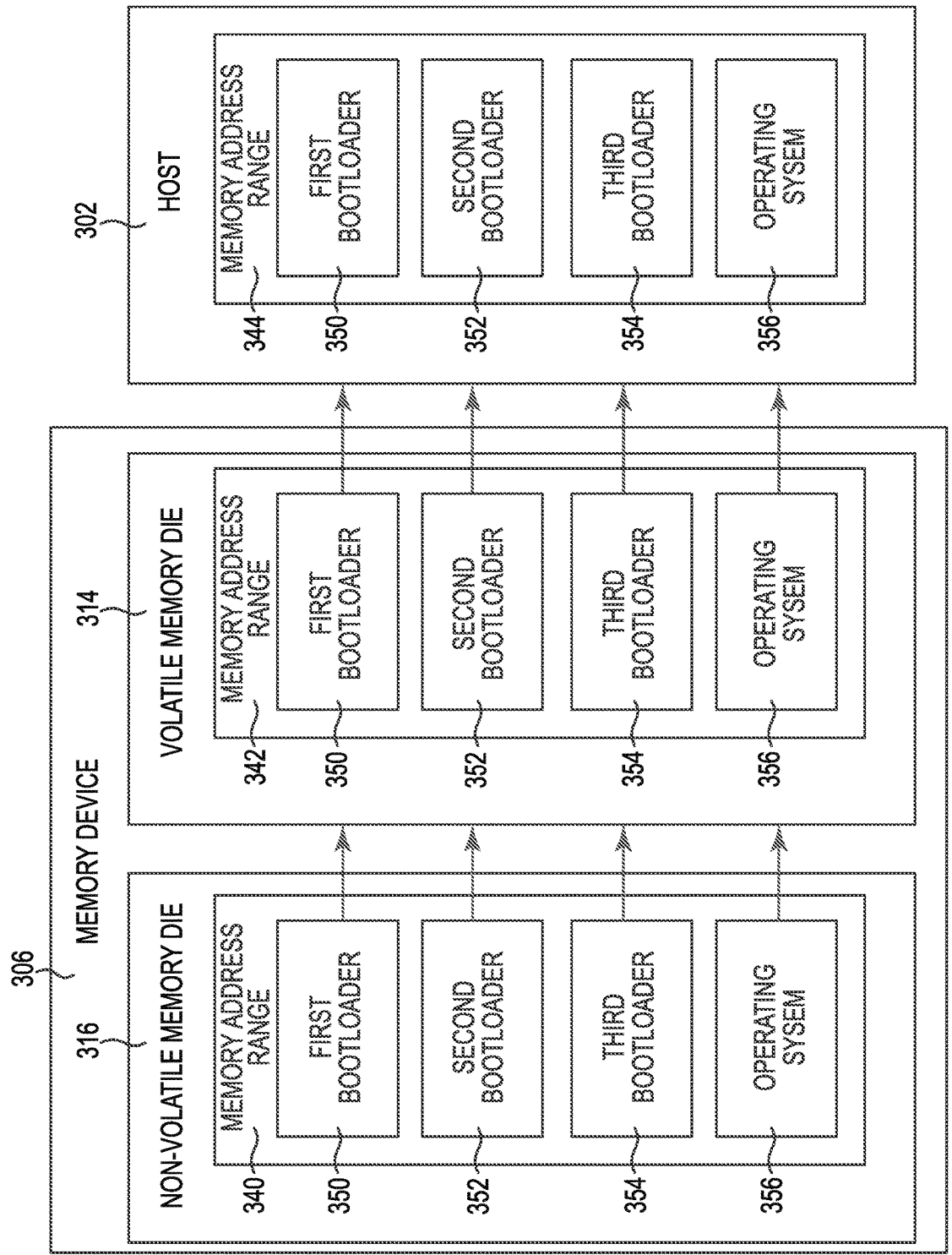
FIG. 3 is a flow diagram of a booting process in accordance with an embodiment of the present disclosure.

FIG. 3 is a flow diagram of a booting process in accordance with an embodiment of the present disclosure. The booting process can begin with a first bootloader 350. A first portion of executable instructions can be included in the first bootloader 350. The first bootloader 350 can be stored at a first memory address range 340 in a non-volatile memory die 316 of memory device 306.

The first bootloader 350 can be copied from the first memory address range 340 to a volatile memory die 314. For example, memory device 306 including the non-volatile memory die 316 and the volatile memory die 314 can be powered on and the first bootloader 350 can be copied from the first memory address range 340 to the volatile memory die 314 in response. In a number of embodiments, the first bootloader 350 including the first portion of executable instructions can be mapped from the first memory address range 340 in the non-volatile memory die 316 to a second memory address range 342 in the volatile memory die 314.

The first bootloader 350 can be transmitted from the volatile memory die 314 to the host 302. For example, the first bootloader 350 including the first portion of executable instructions can be transmitted from the second memory address range 342 in the volatile memory die 314 to the host 302. The first portion of the executable instructions of the first bootloader 350 can include instructions to read the second bootloader 352 image.

Accordingly, the second bootloader 352 can be copied from the first memory address range 340 of the non-volatile memory die 316 to the second memory address range 342 of the volatile memory die 314. Then the second bootloader 352 can be transmitted from the volatile memory die 314 to the host 302 and the host can load the image of the second bootloader 352. A second portion of executable instructions can be included in the second bootloader 352. The second portion of the executable instructions of the second bootloader 352 can include instructions to read the third bootloader 354 image.

A third bootloader 354 can begin after the second bootloader 352. A third portion of executable instructions can be included in the third bootloader 354. The third bootloader 354 can be stored at the first memory address range 340 in the non-volatile memory die 316.

The third bootloader 354 can be copied from the first memory address range 340 to the volatile memory die 314 in response to copying the second bootloader 352 from the volatile memory die 314 to the host 302. In a number of embodiments, the third bootloader 354 including the third portion of executable instructions can be mapped from the first memory address range 340 in the non-volatile memory die 316 to a second memory address range 342 in the volatile memory die 314.

The third bootloader 354 can be transmitted from the volatile memory die 314 to the host 302. For example, the third bootloader 354 including the third portion of executable instructions can be transmitted from the second memory address range 342 in the volatile memory die 314 to the host 302. The first, second, and third portions of executable instructions from the second address memory range in the volatile memory die 314 can be transmitted sequentially. The third portion of the executable instructions of the third bootloader 354 can include instructions to read the operating system 356 image. Accordingly, the host can load the image of the operating system 356.

After the third bootloader 354, an operating system 356 can be initiated. The operating system 356 can include a fourth portion of executable instructions. Initiating the operating system 356 can include loading a partition table, mounting a file system, and/or running a background service. The operating system 356 (e.g., operating system data) can be stored at the first memory address range 340 in the non-volatile memory die 316.

The operating system 356 can be copied from the first memory address range 340 to the volatile memory die 314 in response to copying the third bootloader 354 from the second memory address range 342 to the host 302. In a number of embodiments, the operating system 356 including the fourth portion of executable instructions can be mapped from the first memory address range 340 in the non-volatile memory die 316 to the second memory address range 342 in the volatile memory die 314.

The operating system 356 including the fourth portion of executable instructions can be transmitted from the second memory address range 342 in the volatile memory die 314 to the host 302. In a number of embodiments, the operating system 356 can be transmitted from the volatile memory die 314 to the host 302 after the first, second, and third bootloaders have been transmitted from the volatile memory die 314 to the host 302.

Figure 4:
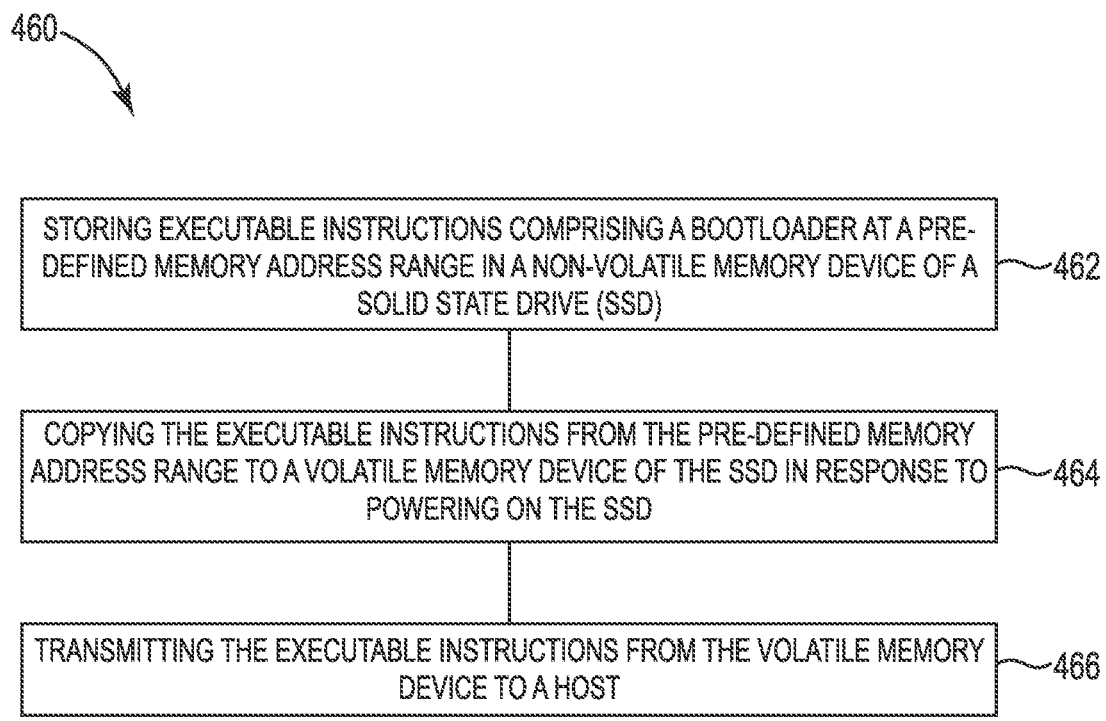
FIG. 4 is a flow diagram of a method for receiving executable instructions from volatile memory in accordance with an embodiment of the present disclosure.

FIG. 4 is a flow diagram of a method 460 for receiving executable instructions from volatile memory in accordance with an embodiment of the present disclosure. At block 462, the method 460 can include storing executable instructions comprising a bootloader at a pre-defined memory address range in a non-volatile memory device of an SSD. The pre-defined memory address range can be received from a user. In a number of embodiments, the pre-defined memory address range can be fixed across power cycles. This enables the pre-defined memory address range to be known at power on of the SSD.

At block 464, the method 460 can include copying the executable instructions from the pre-defined memory address range to a volatile memory device of the SSD in response to powering on the SSD and/or receiving power at the SSD. In some examples, the executable instructions can be copied from the pre-defined memory address range to the volatile memory device in response to a power cycle. The SSD can by a system on a chip (SOC) and/or comprise a component of a vehicle. The SSD and/or a controller of the SSD can be powered on and/or receive power in response to a proximity of a fob of the vehicle being detected and/or the vehicle being turned on. The method 460 can further include mapping the pre-defined address to the volatile memory device.

At block 466, the method 460 can include transmitting the executable instructions from the volatile memory device to a host. The executable instructions can be transmitted to the host in response to receiving a boot load command from the host. In a number of embodiments, the host can execute the executable instructions. The host can execute the executable instructions by loading a second bootloader image, a third bootloader image, and a system image. In some examples, the host can execute the executable instructions by loading a partition table, mounting a file system, and/or running a background service.

Method 460 can further include storing additional executable instructions comprising an operating system image at another pre-defined memory address range in the non-volatile memory device. The additional executable instructions can be copied to the volatile memory device in response to transmitting the executable instruction comprising the bootloader to the host. In a number of embodiments, the additional executable instructions from the volatile memory device can be transmitted from the volatile memory device to the host.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   storing executable instructions comprising a bootloader at a pre-defined memory address range in a non-volatile memory device of a solid state drive (SSD) of an autonomous or partially autonomous vehicle;
   copying the executable instructions from the pre-defined memory address range to a volatile memory device of the SSD in response to a proximity of a fob of the autonomous or partially autonomous vehicle being detected; and
   transmitting the executable instructions from the volatile memory device to a host.

2. The method of claim 1, wherein the method includes receiving the pre-defined memory address range in the non-volatile memory device from a user.

3. The method of claim 1, wherein the pre-defined memory address range is fixed across power cycles.

4. The method of claim 1, wherein the method includes mapping the pre-defined address to the volatile memory device.

5. The method of claim 1, wherein the method includes transmitting the executable instructions to the host in response to receiving a boot load command from the host.

6. The method of claim 1, wherein the method further includes:
   storing second executable instructions comprising a system image at the pre-defined memory address range in the non-volatile memory device;
   copying the second executable instructions to the volatile memory device in response to transmitting the executable instructions comprising the bootloader to the host; and
   transmitting the second executable instructions from the volatile memory device to the host.

7. A solid state drive (SSD) of an autonomous or partially autonomous vehicle, comprising:
   a volatile memory device;
   a non-volatile memory device; and
   a controller coupled to the volatile memory device and the non-volatile memory device, the controller including circuitry configured to:
      receive a pre-defined memory address range from a user;
      store executable instructions at the pre-defined memory address range in the non-volatile memory device;
      in response to a proximity of a fob of the autonomous or partially autonomous vehicle being detected, copy the executable instructions from the pre-defined memory address range to the volatile memory device; and
      transmit the executable instructions from the volatile memory device to a host.

8. The SSD of claim 7, wherein the executable instructions include a number of bootloaders.

9. The SSD of claim 7, wherein the executable instructions include an operating system, utilities, diagnostics, and boot and data recovery information.

10. A solid state drive (SSD) of an autonomous or partially autonomous vehicle, comprising:
    a volatile memory device;
    a non-volatile memory device comprising a first memory address range including executable instructions; and
    a controller coupled to the volatile memory device and the non-volatile memory device, the controller including circuitry configured to:
       map the executable instructions from the first memory address range in the non-volatile memory device to a second memory address range in the volatile memory device in response to a proximity of a fob of the autonomous or partially autonomous vehicle being detected; and
       transmit the executable instructions from the second memory address range in the volatile memory device.

11. The SSD of claim 10, wherein the first memory address range includes a first bootloader, a second bootloader, and a third bootloader.

12. The SSD of claim 10, wherein the non-volatile memory device further comprises operating system data at the first memory address range; and
    wherein the controller is further configured to transmit the operating system data.

13. The SSD of claim 12, wherein the controller is further configured to transmit the operating system data after transmitting a first bootloader, a second bootloader, and a third bootloader sequentially.

14. The SSD of claim 12, further comprising a host interface coupled to the controller;

wherein the controller is configured to transmit the first bootloader, second bootloader, and third bootloader sequentially via the host interface.

15. An autonomous or partially autonomous vehicle, comprising:
a host; and
a memory device including:
a volatile memory device;
a non-volatile memory device; and
a controller including circuitry configured to:
store executable instructions at a pre-defined memory address range in the non-volatile memory device;
in response to a proximity of a fob of the autonomous or partially autonomous vehicle being detected, copy the executable instructions from the pre-defined memory address range in the non-volatile memory device to the volatile memory device; and
transmit the executable instructions from the volatile memory device to a host;
wherein the host is configured to execute the executable instructions.

16. The autonomous or partially autonomous vehicle of claim 15, wherein the non-volatile memory device is a NAND device.

17. The autonomous or partially autonomous vehicle of claim 15, wherein the volatile memory device is a dynamic access memory (DRAM) device.

18. The autonomous or partially autonomous vehicle of claim 15, wherein the memory device is a solid state drive (SSD).

19. The autonomous or partially autonomous vehicle of claim 15, wherein the host is configured to execute the executable instructions by:
loading a second bootloader image;
loading a third bootloader image; and
loading an operating system image.

20. The autonomous or partially autonomous vehicle of claim 19, wherein the host is further configured to execute the executable instructions by:
loading a partition table;
mounting a file system; and
running a background service.

* * * * *